United States Patent

Nomura

[11] 4,035,031
[45] July 12, 1977

[54] CHECK VALVE FOR BRAKING PRESSURE CONTROL VALVE UNIT

[75] Inventor: Yoshihisa Nomura, Toyota, Japan

[73] Assignee: Toyota Jidosha Kogyo Kabushiki Kaisha, Toyota, Japan

[21] Appl. No.: 736,463

[22] Filed: Oct. 28, 1976

[30] Foreign Application Priority Data

Mar. 16, 1976 Japan .............................. 51-28336

[51] Int. Cl.² ...................... B60T 8/18; B60T 8/24; B60T 8/26
[52] U.S. Cl. .............................. 303/6 C; 188/349; 303/22 R; 303/24 A; 303/24 F
[58] Field of Search ............... 303/6 C, 24 R, 24 A, 303/24 C, 24 F, 84 A; 188/349, 195; 303/22; 60/591

[56] References Cited

U.S. PATENT DOCUMENTS

| | | | |
|---|---|---|---|
| 3,163,473 | 12/1964 | Stelzer | 303/24 F X |
| 3,825,303 | 7/1974 | Yabuta | 303/24 C X |
| 3,950,037 | 4/1976 | Pembleton et al. | 303/24 F |
| 3,994,533 | 11/1976 | Ohta | 303/24 C X |

Primary Examiner—Trygve M. Blix
Assistant Examiner—Douglas C. Butler
Attorney, Agent, or Firm—Stevens, Davis, Miller & Mosher

[57] ABSTRACT

In a braking pressure control valve unit incorporated between a master cylinder and rear wheel brake cylinders, a check valve is assembled to directly apply the braking fluid pressure to the rear wheel brake cylinders only when the increasing ratio of deceleration drops due to breakage of the braking fluid pressure circuit for the front wheel brake cylinders.

9 Claims, 7 Drawing Figures

CHECK VALVE FOR BRAKING PRESSURE CONTROL VALVE UNIT

BACKGROUND OF THE INVENTION

The present invention relates to a system for controlling the braking fluid pressure in a wheeled vehicle, and more particularly to a fluid pressure control valve unit incorporated between the master cylinder and the rear wheel brake cylinders of the vehicle to avoid locking and skidding of the rear wheels.

SUMMARY OF THE INVENTION

The primary object of the present invention is to provide a fluid pressure control valve unit wherein when the braking fluid pressure circuit for the front wheel brake cylinders is burst, a bypass passage can be conducted within the control valve unit to directly apply the braking fluid pressure to the rear wheel brake cylinders so as to ensure the braking operation of the vehicle.

Another object of the present invention is to provide a fluid pressure control valve unit wherein an inertia-controlled check valve is assembled to provide direct communication between the master cylinder and the rear wheel brake cylinders in accordance with the master cylinder pressure required to produce a predetermined rate of deceleration.

According to the present invention, there is provided a fluid pressure control valve unit for a vehicle braking system incorporated between the master cylinder and rear wheel brake cylinders, which comprises a housing provided thereon with an inlet port for connection to the master cylinder and an outlet port for connection to the rear wheel brake cylinders and provided therein with a stepped bore connected at one end thereof to the inlet port and at the other end thereof to the outlet port; a differential piston which is slidably disposed within the stepped bore to provide first and second chambers being in constant communication respectively with the inlet port and outlet port and which has piston surfaces providing first and second effective piston areas whereby opposing displacement forces may be provided on the piston respectively in the directions toward and away from the outlet port, the first effective piston area being smaller than the second one; a first valve part of the piston cooperable with a second valve part of the stepped bore wall for controlling intercommunication between the first and second chambers in dependence upon the position of the piston in the stepped bore; and means for biasing the piston in the direction toward a normal position of the piston in which the first and second valve parts provide full communication between the first and improvements chambers. The control valve unit further comprises a second stepped bore provided within the housing and crossing a first internal passage between the inlet port and the first chamber and a second internal passage between the outlet port and the second chamber, the second stepped bore forming at the small diameter portion thereof a bypass passage between the first and second internal passages and forming at both ends thereof a third chamber in communication with the first internal passage and a fourth chamber connected to the third chamber; an inertia-controlled valve provided within the third chamber for normally permitting communication between the third and fourth chambers but adapted to block the communication between the third and fourth chambers when the inertia-controlled valve is subjected to a deceleration in excess of a predetermined value; a control piston slidably disposed within the large diameter portion of the second stepped bore to be moved in the direction toward the third chamber by fluid pressure applied to the fourth chamber from the third chamber; a spring for biasing the control piston toward the original position against fluid pressure in the fourth chamber; and a check valve means disposed within the bypass passage and adapted to cooperate with the control piston to normally close the bypass passage.

In use of the above mentioned control valve unit, the rate of deceleration is detected by the inertia-controlled valve, and only when the increasing ratio of deceleration drops due to breakage or damage of the braking fluid pressure circuit for the front wheel brake cylinders, the control piston is moved by fluid pressure applied to the fourth chamber to open the check valve means so that the first internal passage is directly connected to the second internal passage through the bypass passage.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
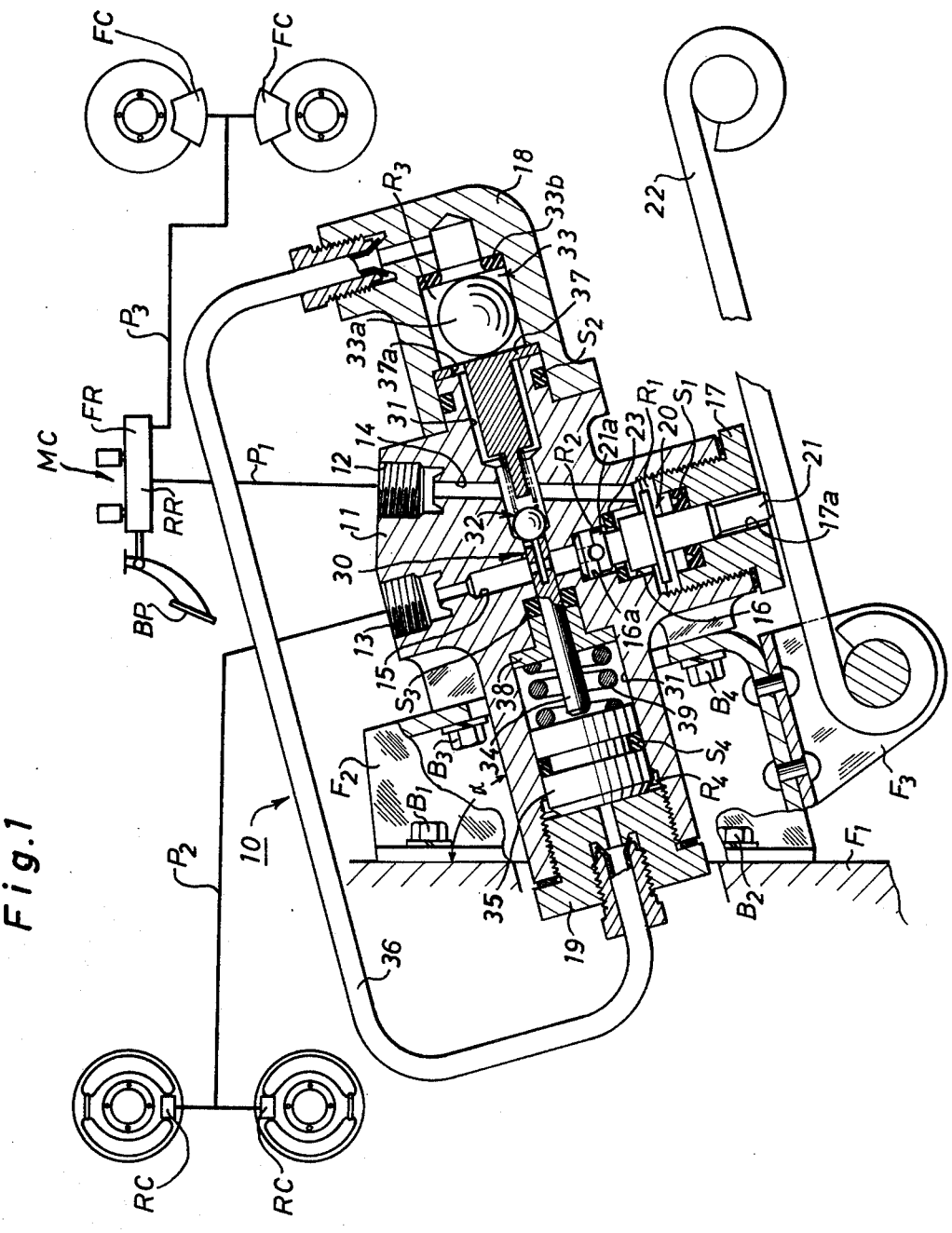
FIG. 1 illustrates a vertical cross-section of a fluid pressure control valve unit in accordance with the present invention.

Referring now to the accompanied drawings, FIG. 1 illustrates a fluid pressure control valve unit 10 for a vehicle braking system which is located between a pipe-line $P_1$ from the rear pressure chamber RR of a tandem master cylinder MC and a pipe-line $P_2$ leading to the rear wheel cylinders RC of the brakes on the rear wheel of the vehicle. The front pressure chamber FR of the master cylinder MC is directly connected to the front wheel cylinders FC of the brakes on the front wheel of the vehicle by way of a pipeline $P_3$.

The control valve unit 10 is fixed on the vehicle body frame $F_1$ with an inclined angle $\alpha$ to the fore and aft center line of the vehicle. Assembled within a housing 11 of the control valve unit 10 are a conventional pressure control valve assembly 20 and an inertia-controlled check valve assembly 30 which takes on an important role in the present invention. The housing 11 is firmly mounted by fastening bolts $B_3$, $B_4$ on a stationary bracket $F_2$ which is fixed on the vehicle body frame $F_1$ by fastening bolts $B_1$, $B_2$. The housing 11 is provided at the upper portion thereof with an inlet port 12 connected to the pipe-line $P_1$ and an outlet port 13 connected to the pipe-line $P_2$. A stepped bore 16 in the housing 11 is connected at one end thereof to the inlet port 12 through a first internal passage 14 and connected at the other end thereof to the outlet port 13 through a second internal passage 15.

The pressure control valve assembly 20 includes a differential piston 21 assembled in the stepped bore 16 to regulate fluid communication between the internal passages 14 and 15 and a bar spring 22 to control the movement of the differential piston 21. The head portion of the piston 21 is axially slidable within the small diameter portion 16a of the stepped bore 16. The lower portion of the differential piston 21 is slidable through an annular seal member $S_1$ within a through hole 17a of a plug 17 screwed into the housing body 11 and is engaged at the outer end thereof with the bar spring 22. The neck portion of the differential piston 21 is provided with an annular valve portion 21a to be received by an annular valve seat 23 fixed on the stepped portion of the bore 16. Thus, within the stepped bore 16, the differential piston 21 forms a first pressure chamber $R_1$ connected to the inlet port 12 by way of the first internal passage 14 and a second pressure chamber $R_2$ connected to the outlet port 13 by way of the second internal passage 15. The bar spring 22 is pivoted at one end thereof on an upper bracket $F_3$ fixed to the stationary bracket $F_2$ and pivoted at the other end thereof on a wheel axle support means (not shown). Thus, the differential piston 21 is loaded by the bar spring 22 in accordance with the loading of the vehicle.

The inertia-controlled check valve assembly 30 comprises a check valve 32, an inertia-controlled valve 33, a push rod 34 and a control piston 35 which are coaxially assembled within a second stepped bore 31 of the housing 11 crossing the internal passages 14 and 15. The forward end of the stepped bore 31 is closed by a side housing 18 which is fluid-tightly fixed to the forward end of the housing 11 through an annular seal member $S_2$. The rear end of the stepped bore 31 is closed by a plug 19 fluid-tightly screwed into the housing 11. Thus, the forward and rearward ends of the stepped bore 31 are communicated to each other by a connecting pipe 36 which is connected at both ends thereof to the side housing 18 and the plug 19.

Figure 2:
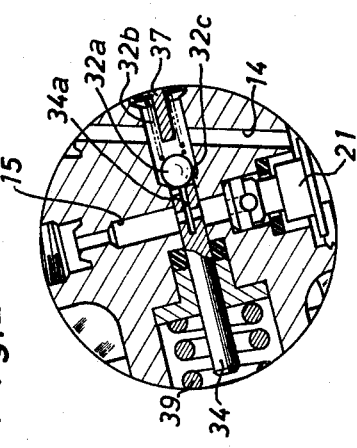
FIG. 2 is an enlarged view showing a portion of the control valve unit of FIG. 1.

As well seen in FIG. 2, the check valve 32 comprises a ball 32a disposed in the stepped bore 31 between the internal passages 14, 15 and a compression spring 32b interposed between a retainer 37 and the ball 32a to urge the ball 32a rearwardly. Thus, the ball 32a is normally received on an annular valve seat 32c formed by an innershoulder of the stepped bore 31 and blocks the fluid communication between the internal passages 14 and 15. The retainer 37 is firmly mounted between the main housing 11 and the side housing 18.

Referring back to FIG. 1, the inertia-controlled valve 33 comprises an inertia ball 33a which is free to roll forwardly on the inclined bottom of a third pressure chamber $R_3$ formed within the side housing 18 and an annular valve seat 33b fixed within the side housing 18. The ball 33a normally rests under gravity in the position shown in the drawing to open the inertia-controlled valve 33. In addition, the third pressure chamber $R_3$ is in open communication with the first internal passage 14 through an orifice 37a of the retainer 37 and connected to the rearward end of the stepped bore 31 by way of the inertia-controlled valve 33 and the connecting pipe 36. When the rate of deceleration caused by application of the brakes exceeds a predetermined valve $g_1$, the ball 33a moves into engagement with the valve seat 33b by the inertia forces acting thereon to close the inertia-controlled valve 33.

The push rod 34 is slidably engaged within the small diameter portion of the stepped bore 31 through a retainer 38 and an annular seal member $S_3$ and is provided at the forward end thereof with a passage 34a including an axial hole, a radial through hole and a radial recess, as well seen in FIG. 2. The control piston 35 is slidably engaged within the large diameter portion of the stepped bore 31 through an annular seal member $S_4$ and is loaded rearwardly by a compression spring 39 interposed between the piston 35 and the retainer 38. Thus, the piston 35 is separated from the push rod 34 and engages the inner wall of the plug 19 to form a fourth pressure chamber $R_4$ at the rearward end of the stepped bore 31, the pressure chamber $R_4$ being connected to the third pressure chamber $R_3$ by way of the connecting pipe 36 and the inertia-controlled valve 33.

Figure 3:
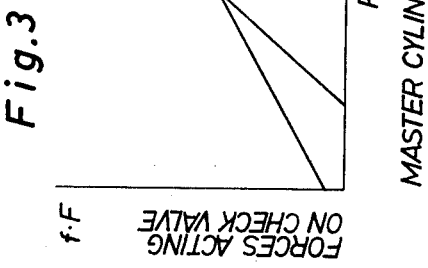
FIG. 3 is a graph showing a relation between master cylinder pressure and forces acting on the ball of the check valve shown in FIG. 1.

FIG. 3 shows forward and rearward forces F and f acting on the ball 32a of the check valve 32 in relation to a master cylinder pressure $P_m$. The forward force F is the one that the piston 35 urges the ball 32a by way of the push rod 34 when the piston 35 moves forward against the resilient force of the compression spring 39 by the master cylinder pressure $P_m$ applied to the fourth pressure chamber $R_4$. The rearward force f is a total of the resilient force of the compression spring 32b and the pushing force of the master cylinder pressure $P_m$ acting on the ball 32a. In FIG. 3, it is noted that when the master cylinder pressure $P_m$ applied to the fourth pressure chamber $R_4$ exceeds a predetermined valve $P_{m_1}$, the check valve 32 will open to bypass the passage 14 to the passage 15 through the passage way 34a of the push rod 34.

Hereinafter the function of the fluid pressure control valve unit 10 will be described in detail. In the unloaded condition of the vehicle, so long as all the fluid pipe-lines including the master cylinder MC and the front and rear wheel cylinders FC and RC are in the normal condition and there is no trouble, depression of the brake pedal BP produces braking pressure within the front and rear pressure chambers FR and RR of the master cylinder MC. The master cylinder pressure within the front pressure chamber FR is directly applied to the front wheel cylinders FC through the pipe-line $P_3$ and the master cylinder pressure within the rear pressure chamber RR is applied to the inlet port 12 of the valve unit 10 through the pipe-line $P_1$. Within the valve unit 10, the master cylinder pressure is applied to the third pressure chamber $R_3$ through the internal passage 14, the stepped bore 31 and the orifice 37a of the retainer 37 and subsequently applied to the fourth pressure chamber $R_4$ through the inertia-controlled valve 33 and the connecting pipe 36. At the same time, the master cylinder pressure is applied to the rear wheel cylinders RC through the internal passage 14, the first and second pressure chambers $R_1$ and $R_2$, the internal passage 15, the outlet port 13 and the pipe-line $P_2$ in sequence.

Figure 4:
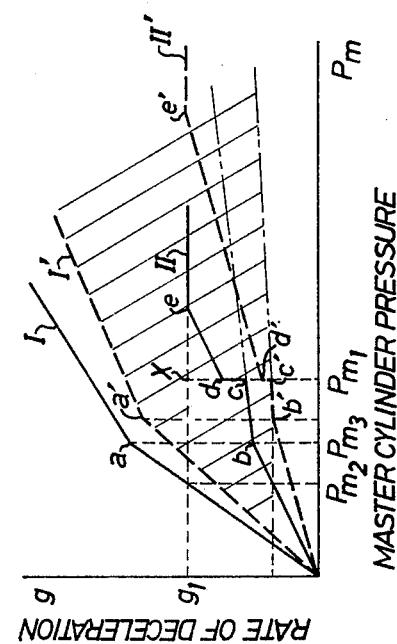
FIG. 4 is a graph showing increasing ratios of deceleration in relation to increase of master cylinder pressure.

When the master cylinder pressure is applied to the front and rear wheel cylinders FC, RC and the pressure chambers $R_1$, $R_2$, $R_3$ and $R_4$ of the valve unit 10 as described above, the braking operation is effected to increase the rate of deceleration g of the vehicle as indicated by solid line I in FIG. 4. In this instance, within the valve unit 10, the differential piston 21 is moved downward against the biasing force of the bar spring 22 by pressure acting on the end of the piston 21 of greater area and the control piston 35 is slightly urged forward against the biasing force of the compression spring 39 by the master cylinder pressure applied to the fourth pressure chamber $R_4$.

When the rate of deceleration g exceeds the predetermined value $g_1$, the inertia force acting on the ball 33a causes it to roll forwardly up the inclined bottom of the chamber $R_3$ so that the inertia-controlled valve 33 is closed to block the communication between the pressure chambers $R_3$ and $R_4$. As a result, only a pressure of a value $P_{m_2}$ is stored within the fourth pressure chamber $R_4$. When the master cylinder pressure reaches a value $P_{m_3}$, the valve face 21a of the differential piston 21 engages the valve seat 23 to momentarily block communication between the first and second pressure chambers $R_1$ and $R_2$. This timing falls on a point a on the line I in FIG. 4. Pressure increases in the first pressure chamber $R_1$ while the valve seat 23 is closed causing upward movement of the differential piston 21 which results in the valve seat 23 opening again. In this manner, the closing and opening operation of the valve seat 23 is repeated in reciprocatory operation while the piston 21 is in its displaced position, thereby to control the braking pressure applied to the rear wheel cylinders RC as shown by the solid line I in FIG. 4. In this instance, the ball 33a of the inertia-controlled valve 33 rests on the valve seat 33b by the inertia of itself and the pressure difference between the third and fourth pressure chambers $R_3$ and $R_4$. This holds the pressure within the fourth pressure chamber $R_4$ substantially at the value $P_{m_2}$ to keep the check valve 32 closed.

In the unloaded condition of the vehicle, if the front wheel braking system is burst, the depression of the brake pedal BP produces braking pressure only in the rear pressure chamber RR of the master cylinder MC. This braking pressure is applied only to the inlet port 12 of the control valve unit 10 through the pipe-line $P_1$. As in the case of normal operation, the master cylinder pressure is applied to the pressure chambers $R_1$, $R_2$, $R_3$ and $R_4$ within the valve unit 10 as well as to the rear wheel cylinders RC. Thus, only the braking operation of the rear brakes is affected and the rate of deceleration g increases at a lower ratio than in normal operation. The increase of the rate of deceleration is indicated by a solid line II in FIG. 4. Within the valve unit 10, the differential piston 21 is moved downward and the control piston 35 is slightly urged forward as in normal operation. When the master cylinder pressure reaches a predetermined value $P_{m_3}$, the valve face 21a of the differential piston 21 closes the valve seat 23 to block communication between the first and second pressure chambers $R_1$ and $R_2$. This timing falls on a point b of the line II in FIG. 4. Pressure increase in the first pressure chamber $R_1$ while the valve seat 23 is closed causes upward movement of the piston 21 which results in the valve seat 23 opening again. In this manner, the closing and opening operation of the valve seat 23 is repeated in reciprocatory operation while the piston 21 is in its displaced position, thereby to control the braking pressure applied to the rear wheel cylinders RC as in normal operation. As a result, the relation between the master cylinder pressure $P_m$ and the rate of deceleration g of the vehicle is indicated by segment b–c on the line II in FIG. 4.

When the master cylinder pressure reaches the predetermined value $P_{m_1}$, the control piston 35 will open the check valve 32 by way of the push rod 34 so that the master cylinder pressure is directly applied from the passage 14 to the passage 15 through the check valve 32 and the passage 34a of the push rod 34. Thus, the master cylinder pressure is directly applied to the rear wheel cylinders RC to cause a rapid increase in the rate of deceleration g from a point c to a point d on the line II in FIG. 4. Then, in accordance with the increase of the master cylinder pressure, the rate of deceleration g increases as shown by segment d–e on the line II in FIG. 4. When the rate of deceleration g reaches the predetermined value $g_1$, the ball 33a of the inertia-controlled valve 33 rolls forwardly up the incline to close the valve seat 33b so as to block communication between the third and fourth pressure chambers $R_3$ and $R_4$, thereby to hold the pressure within the fourth pressure chamber $R_4$ at a stable value.

Further increase of the master cylinder pressure acting on the forward end of the push rod 34 urges the push rod 34 rearward so that the ball 32a of the check valve 32 closes the valve seat 32c by biasing force of the compression spring 32b to block the direct communication between the passages 14 and 15. In this instance, the differential piston 21 is moved downward to close the valve seat 23 so as to block the communication between the first and second pressure chambers $R_1$ and $R_2$. This timing falls on a point e on the line II in FIG. 4. This operation continues until the line II crosses an extended line of the segment between the points b and c. Finally, the braking pressure applied to the rear wheel cylinders RC is controlled at a predetermined value and the rate of deceleration g of the vehicle is kept at the predetermined value $g_1$.

In the loaded condition of the vehicle, the biasing force of the bar spring 22 will increase proportionally to the increase of the vehicle loads. Thus, the master cylinder pressure to move the differential piston 21 downward will be required to be larger than in the case of the unloaded condition of the vehicle. In other words, in FIG. 4 the points a and b on the lines I and II are replaced with points a' and b' on lines I' and II'. It should easily be recognized that when a same value of the master cylinder pressure is applied to the front and rear wheel cylinders FC and RC or only to the rear wheel cylinders RC, the braking effect is less in the loaded condition than in the unloaded condition. This means that the increased ratio of the rate of deceleration g is smaller in the loaded condition. When the above described two facts are taken into consideration in respect with the lines I' and II' in FIG. 4, the operation of the whole system in the loaded condition becomes self-explanatory from the description of the operation in the unloaded condition.

In the above embodiment, the description is based on the example when a crossing point x of the predetermined rate of deceleration $g_1$ and the predetermined master cylinder pressure $P_{m_1}$ is set as illustrated in FIG. 4. The crossing point x can be selected within the area indicated by slant lines in FIG. 4.

Figure 5:
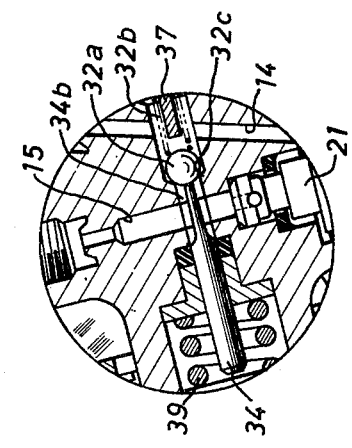
FIG. 5 illustrates a modification of the check valve shown in FIG. 1.

FIG. 5 illustrates a modification of the above embodiment, in which the forward end of the push rod 34 is tapered. In this modification, when the check valve 32 is open, the internal passages 14 and 15 are communicated to each other through an annular passage 34b formed around the tapered end of the push rod 34.

Figure 6:
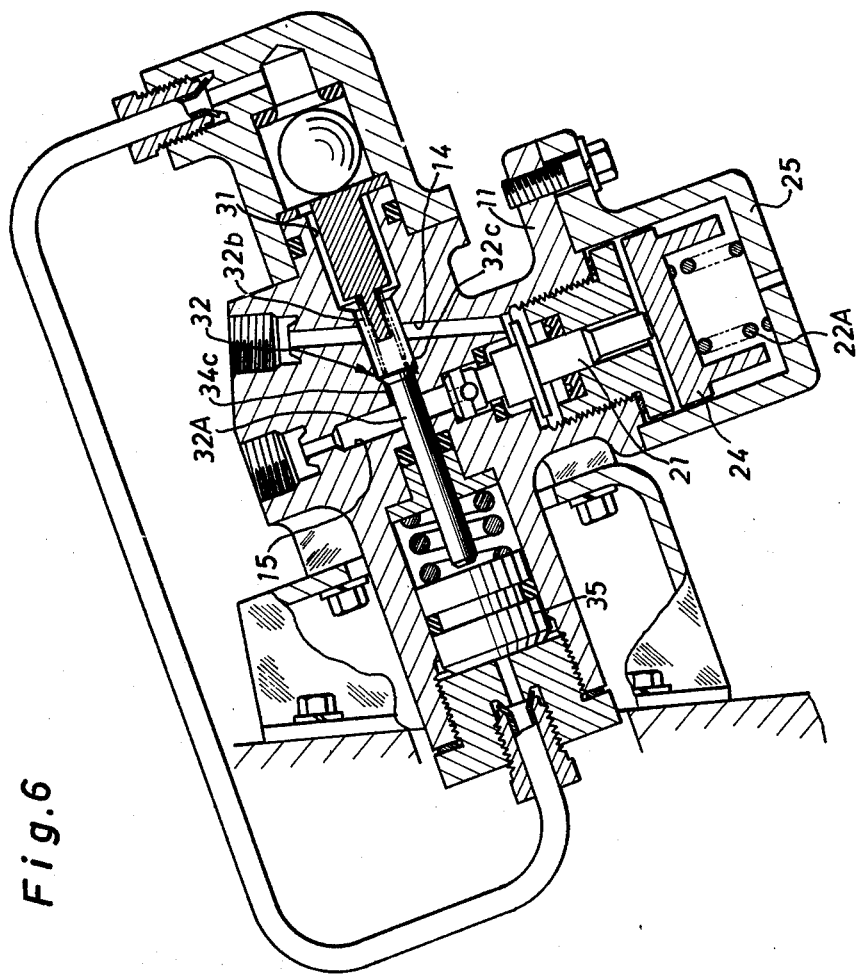
FIGS. 6 and 7 illustrate another modifications of the check valve shown in FIG. 1.

FIG. 6 illustrates another modification, wherein a coil spring 22A is adapted to regulate the movements of the differential piston 21. The coil spring 22A is interposed between a lower housing 25 mounted on the main housing 11 and the lower end of the piston 21 through a retainer 24. Thus, the movements of the piston 21 are regulated independently of the vehicle loading. Furthermore, in this modification, the ball 32a of the check valve 32 and the push rod 34 of the above embodiment are replaced with a poppet valve 32A. When this poppet valve 32A opens, the internal passage 14 is directly connected to the internal passage 15 through an axial groove 34c drilled on the upper side of the stepped bore 31.

Figure 7:
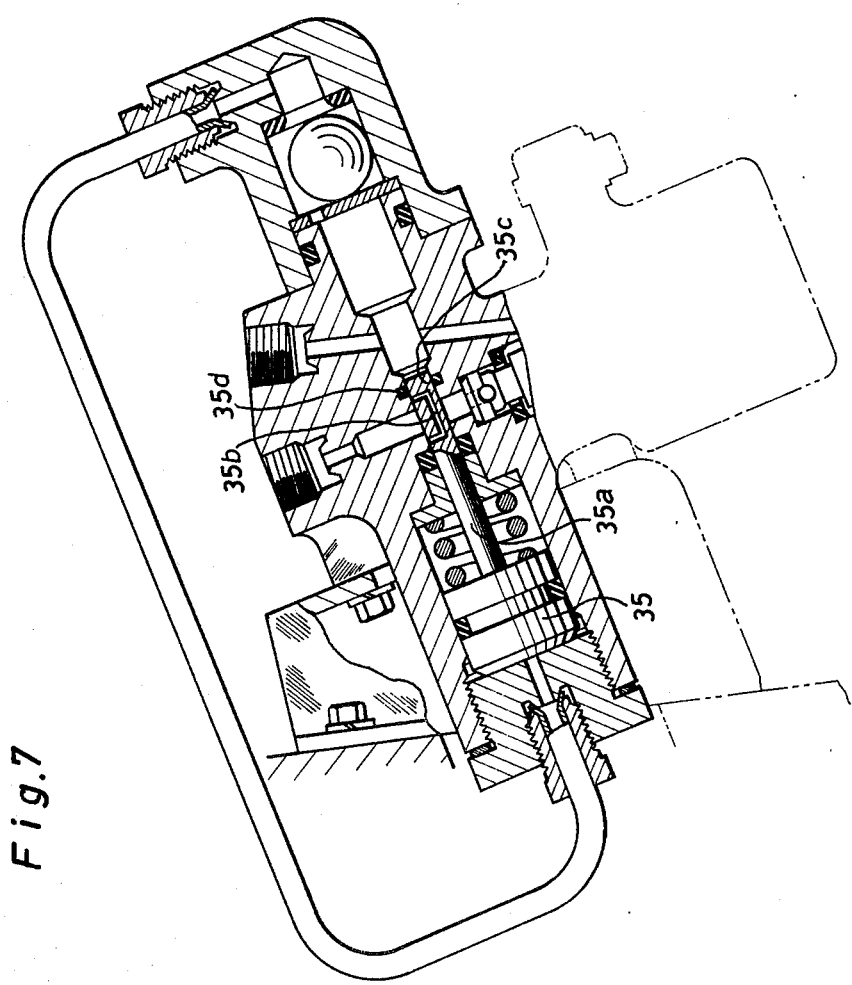

In the above embodiment and modifications, the control piston 35 and the push rod 34 are provided independently, but these two parts may be formed as a single member as illustrated in FIG. 7. In this modification, a push rod 35a extended from the piston 35 is provided thereon with a U-shaped passage 35b and the check valve 32 of the above embodiment is replaced with the forward end of the rod 35a and an annular valve seat 35d.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a fluid pressure control valve unit for a vehicle braking system incorporated between a master cylinder and rear wheel brake cylinders, comprising:
    a housing provided thereon with an inlet port for connection to the master cylinder and an outlet port for connection to the rear wheel brake cylinders and provided therein with a stepped bore connected at one end thereof to said inlet port and at the other end thereof to said outlet port;
    a differential piston which is slidably disposed within said stepped bore to provide first and second chambers, being in constant communication respectively with said inlet and outlet ports, and which has piston surfaces providing first and second effective piston areas whereby opposing displacement forces may be provided on said piston respectively in the directions toward and away from said outlet port, the first effective piston area being smaller than the second one;
    a first valve part of said piston co-operable with a second valve part of the stepped bore wall for controlling intercommunication between said first and second chambers in dependence upon the position of said piston in said stepped bore; and
    means for biasing said piston in the direction toward a normal position of said piston in which said first and second valve parts provide full communication between said first and second chambers;
    the improvments which comprises
    a second stepped bore provided within said housing and crossing a first internal passage between said inlet port and said first chamber and a second internal passage between said outlet port and said second chamber, said second stepped bore forming at a small diameter portion thereof a bypass passage between said first and second internal passages and forming at both ends thereof a third chamber in communication with said first internal passage and a fourth chamber connected to said third chamber;
    an inertia-controlled valve provided within said third chamber for normally permitting communication between said third and fourth chambers but adapted to block the communication between said third and fourth chambers when said inertia-controlled valve is subjected to a deceleration in excess of a predetermined value;
    a control piston slidably disposed within a large diameter portion of said second stepped bore to be moved in the direction toward said third chamber by fluid pressure applied to said fourth chamber from said third chamber;
    a spring for biasing said control piston toward the original position against fluid pressure applied to said fourth chamber; and
    a check valve means disposed within said bypass passage and adapted to co-operate with said control piston to normally close the bypass passage;
    whereby when said control piston is moved by fluid pressure in said fourth chamber against said spring, said check valve means will open said bypass passage to provide direct communication between said first and second internal passages.

2. A fluid pressure control valve unit as claimed in claim 1, wherein when said housing is mounted on a portion of a vehicle body with an inclined angle in relation to the horizontal line along the longitudinal direction of the vehicle body, said first named-stepped bore is vertically arranged within said housing and said second stepped bore is arranged in the longitudinal direction of the vehicle body.

3. A fluid pressure control valve unit as claimed in claim 1, wherein said check valve means comprises a push rod slidably engaged within a small diameter portion of said second stepped bore including said bypass passage and adapted to co-operate with said control piston; a valve seat provided on an inner shoulder of said bypass passage exposed to said first internal passage; and a spring loaded valve element adapted to co-operate with said valve seat to normally close said bypass passage.

4. A fluid pressure control valve unit as claimed in claim 3, wherein said push rod is provided at the forward end thereof with a communication passage through which said first internal passage is communicated with said second internal passage to open said bypass passage.

5. A fluid pressure control valve unit as claimed in claim 3, wherein the forward end of said push rod is tapered to permit fluid flow from said first internal passage to said second internal passge through said bypass passage.

6. A fluid pressure control valve unit as claimed in claim 1, wherein said check valve means comprises a poppet valve member slidably engaged within a small diameter portion of said second stepped bore including said bypass passage and adapted to co-operate with said control piston; a valve seat provided on an inner shoulder of said bypass passage exposed to said first internal passage to receive a valve part of said poppet valve member thereon; and means for biasing said poppet valve member in the direction to engage the valve part with said valve seat; and wherein said bypass passage is provided therein with an axial groove to communicate said first internal passage with said second internal passage.

7. A fluid pressure control valve unit as claimed in claim 1, wherein said check valve means comprises a push rod slidably engaged within a small diameter portion of said second stepped bore including said bypass passage and connected at the rearward end thereof to said control piston; and a valve seat provided within said bypass passage to receive the forward end of said push rod thereon; and wherein said push rod is provided at the forward end thereof with a communication passage to provide direct communication between said first and second internal passages.

8. A fluid pressure control valve unit as claimed in claim 1, wherein said inertia-controlled valve means comprises a valve seat provided on an inner wall of said third chamber; and a ball adapted to co-operate with said valve seat and rolling on an inclined surface of which the inclination is varied in accordance with the rate of deceleration of the vehicle.

9. A fluid pressure control valve unit as claimed in claim 1, wherein said biasing means for said differential piston comprises a vehicle load sensing device operative to increase and decrease the biasing on said differential piston in the direction toward said outlet port on increasing and decreasing the vehicle loading.

* * * * *